UNITED STATES PATENT OFFICE.

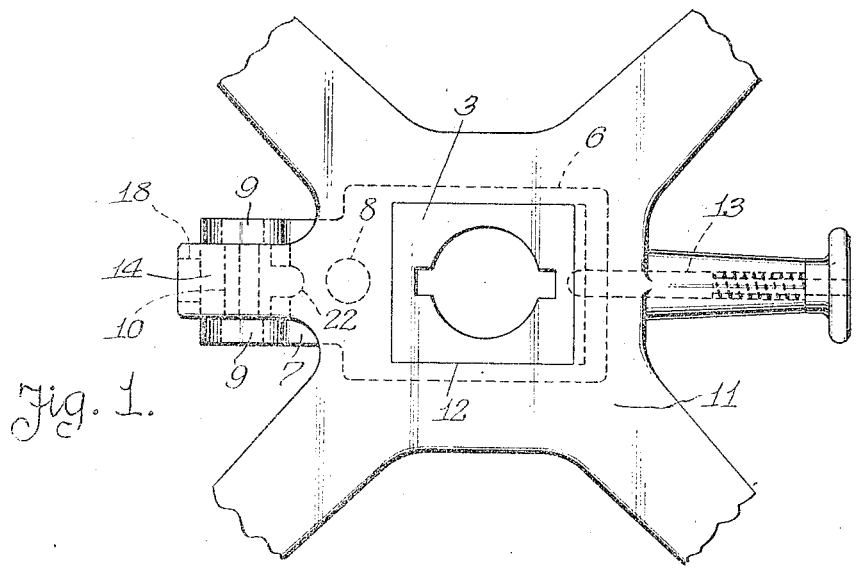
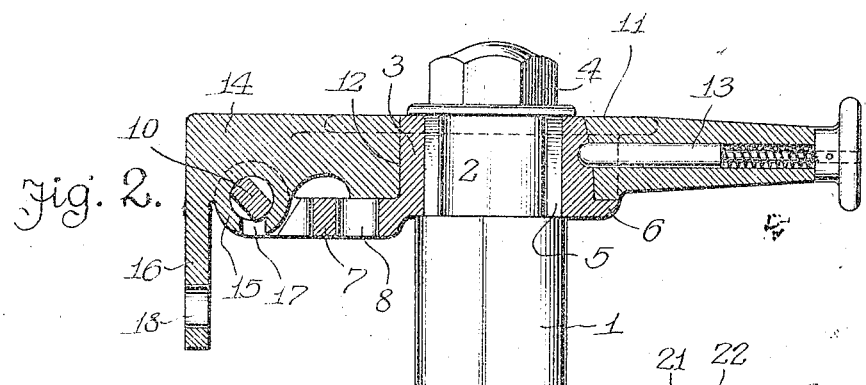
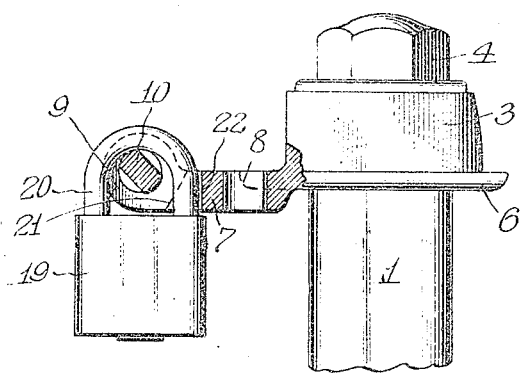
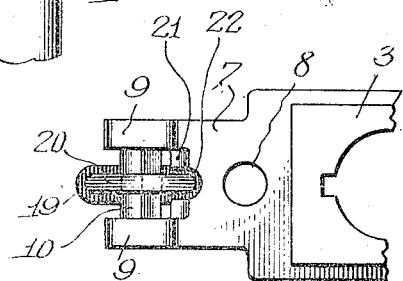

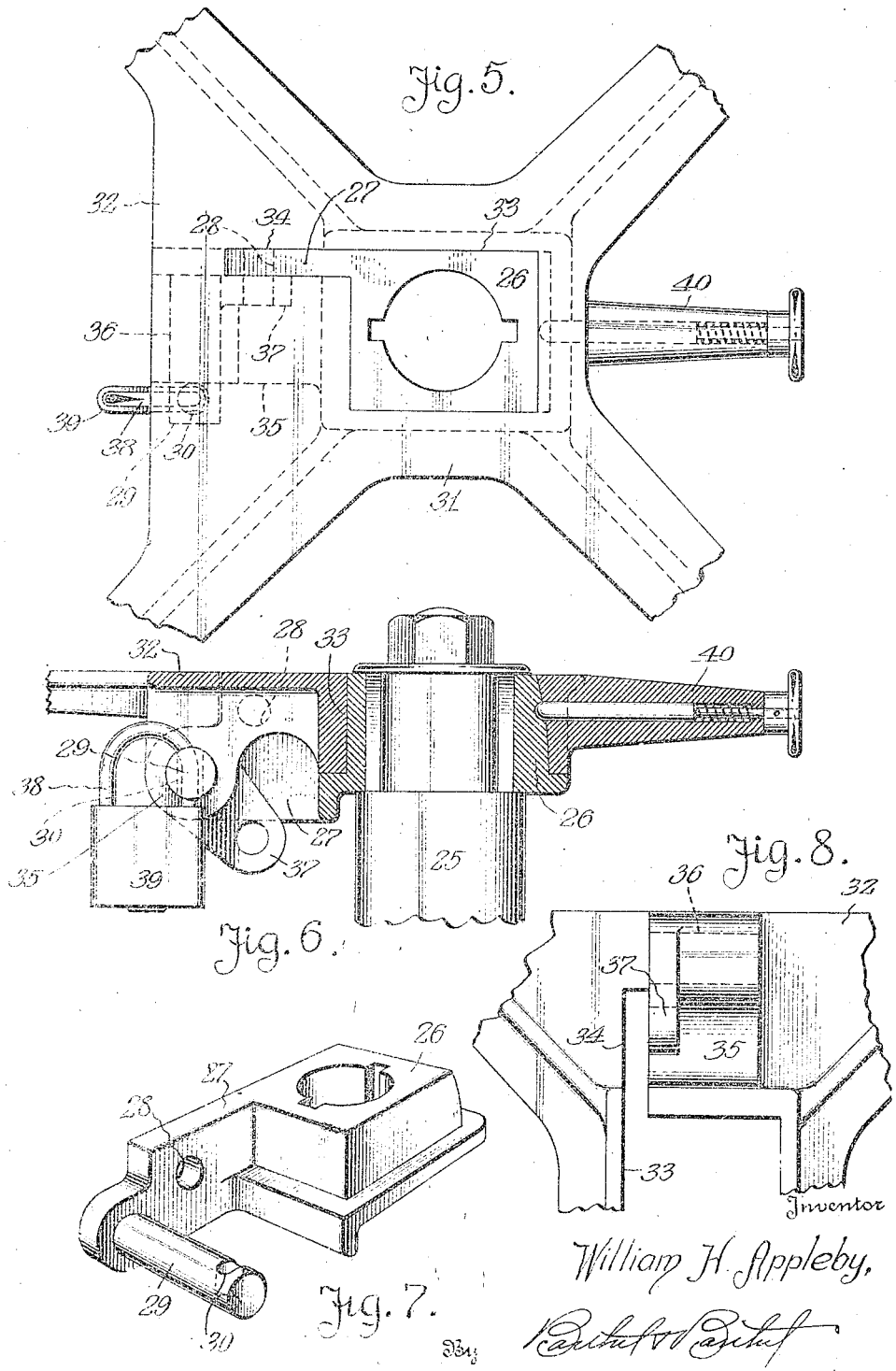

WILLIAM H. APPLEBY, OF WINDSOR, ONTARIO, CANADA.

HINGE AND LOCK FOR STEERING-WHEELS.

1,351,603.   Specification of Letters Patent.   Patented Aug. 31, 1920.

Application filed August 1, 1919. Serial No. 314,659.

*To all whom it may concern:*

Be it known that I, WILLIAM H. APPLEBY, a subject of the King of Great Britain, residing at Windsor, in the county of Essex, Province of Ontario, Dominion of Canada, have invented certain new and useful Improvements in Hinges and Locks for Steering-Wheels, of which the following is a specification, reference being had therein to the accompanying drawings.

My invention aims to provide a novel hinge and lock therefor, the hinge being constructed so that the parts thereof may be separated and permit of one part being portable relative to a stationary part. The lock for the hinge is adapted to maintain the parts together so as to be in position for operative relation and also to prevent another part from being substituted when the lock is carried by one of the parts. In other words, the hinge parts must be used together and should one of the hinge parts be removed it is impossible to use the other part when the lock is in place. It is in this connection that my improved hinge and its lock have been especially designed for the steering wheel of an automobile or other vehicle; the steering wheel of a motor boat or other craft, and the steering wheel of any craft adapted to be manually controlled. When so associated, the hinge permits of the steering wheel being tilted or shifted at an angle relative to a steering post or shaft so as to provide clearance at one side of the post or shaft. Besides the hinge permitting of a tiltable movement, it is possible to shift the steering wheels at an angle and then completely remove the same, thus preventing the steering mechanism from being surreptitiously used by the usual wheel. To prevent another wheel from being substituted for the original wheel, the lock is installed to render one of the hinge parts inoperative or protected against a substitute wheel or hinge part. Besides the lock serving this purpose it may be also employed for locking the wheel in a tilted out-of-the-way position, so that it will be practically impossible to rotate or steer a post or shaft by the tilted wheel. The use of a steering wheel in such position soon attracts attention and indicates that an unauthorized person is using the automobile, so since such use could be easily detected, it is obvious that no such attempt would be made, particularly when an automobile or other vehicle is being stolen.

However, since the novel hinge parts permit of a steering wheel being completely removed relative to its post or shaft, it is possible for an operator to carry off the steering wheel and leave the post or shaft equipment in such condition that another steering wheel cannot be conveniently substituted for the removed steering wheel.

As an example of the use of the hinge and lock, reference will now be had to the drawing, wherein—

Figure 1 is a plan of the hub portion of a steering wheel constructed in accordance with my invention;

Fig. 2 is a cross sectional view of the same;

Fig. 3 is a side elevation of a stationary hinge member or part as forming part of a steering post or column;

Fig. 4 is a plan of the same;

Fig. 5 is a plan of a modified form of my construction;

Fig. 6 is a cross sectional view of the same;

Fig. 7 is a perspective view of a post block, and

Fig. 8 is a bottom plan of a portion of a wheel hub.

In the drawing, the reference numeral 1 denotes a portion of a steering post or shaft having the upper end thereof reduced, as at 2, and provided with a block or head 3 which is retained on the reduced end of the steering post by a nut or cap 4, said block or head being non-rotatably held relative to the steering post by keys 5 or other fastening means. The block 3 is substantially rectangular in plan and has its lower edges formed with a ledge 6, and a rearwardly extending stationary hinge member 7, said hinge member being apertured, as at 8, and bifurcated or forked to provide side lugs or barrels 9. The side lugs or barrels 9 are connected by a transverse pin 10 and said pin for the greater part of its length is rectangular in cross section, particularly between the side lugs 9, so that the pin 10 will present opposed flat facets and thereby having a reduced portion of less width than the diameter of the pin. The pin 10 is necessarily disposed transversely of the member 7 and the facets of said pin are in parallel planes that intersect the plane of the hinge member 7.

The steering wheel hub is designated 11 and is provided with a rectangular opening 12 so that the hub may easily fit over the block 3 and establish a driving or rotating relation between the wheel hub and the post or shaft 1, thus permitting of the wheel hub being used to rotate the steering post or shaft when the steering wheel is properly positioned relative to the steering post. The greater part of the wheel hub 11 is adapted to rest on the ledge 6 of the block 3 and also upon the stationary hinge member 7, said wheel hub having its front side provided with a locking device 13 so that it may be temporarily held against vertical or angular displacement during its active position at the upper end of the steering post or shaft 1. The locking device 13 may be in the form of a spring pressed plunger located in a housing carried by the wheel hub.

At the rear side of the steering wheel hub is a movable hinge member 14 having a barrel 15 and an arm 16. The barrel 15 is provided with a longitudinal slot 17 and the arm 16 with an aperture 18. The slot 17 of the barrel 15 permits of the movable hinge member 14 being placed in engagement with the pin 10 when the steering wheel is held at an angle, for instance at an angle of ninety degrees, and the barrel shifted toward and on to the pin 10. The slot 17 being of a greater width than the pin 10 permits of the barrel 15 receiving said pin with said barrel between the side lugs 9. Then, when the movable hinged member 14 is moved in either direction from its plane of articulation with the pin 10, the barrel 15 turns about the pin and the hinged members are articulated so that the movable hinged member may be safely moved on its pivot relative to the stationary member 10. The pivotal connection between the hinged members is a sufficient distance from the post or shaft 1 to permit of the wheel hub swinging downwardly over the block or head 3, and as said wheel hub is seated on the ledge 6 the locking device is snapped into engagement with the block to hold the wheel hub against accidental vertical displacement during rotation of the steering post or shaft 1.

When it is desired to provide clearance at the front side of the steering post or shaft 1, so that a chauffeur or operator may conveniently move, the steering wheel is swung upwardly, the front edge of the wheel passing over the top of the steering post so that the wheel assumes a position parallel to the axis of the steering post. When in such position at the front side of the steering post, the apertured arm 16, engages the lower face of the stationary hinge member 7 and may be locked in engagement therewith by a conventional form of padlock 19 which may have its shackle pass through the apertures 8 and 18. It will therefore be impossible for a person to lower the steering wheel to an active position and use the steering mechanism, unless authorized by having a key for the lock 19.

It also possible, as brought out in the beginning, to completely remove the steering wheel and after doing so the lock 19 may have its shackle 20 placed in engagement with a pin 10, between the lugs 9, as brought out in Figs. 3 and 4. This will prevent the substitution of another wheel as the shackle 20 blocks the path of any wheel hub barrel, similar to the barrel 15, that may accommodate the pin 10. By reference to Figs. 2 and 4 it will be noted that the stationary hinge member 7 is cut away or beveled, as at 21, to provide clearance for the barrel 15, and further cut away, as at 22, to provide clearance for the lock shackle. With the lock shackle 20 extending into the cut away portion 22 and properly proportioned relative to the stationary hinge member 7, it is impossible to shift the lock shackle longitudinally of the pin 10 and turn the same over one of the lugs 9 so as to clear said pin.

Considering the modification shown in Figs. 5 to 8 inclusive, the steering post 25 has its upper end provided with a block 26 having a rearwardly extending side arm 27, which is apertured, as at 28, and provided with a hinge pivot pin 29. The pin 29 has a free end provided with an aperture 30 and said pin is disposed in parallelism with the rear face of the block 26 and provides a gap between said pin and said block.

The wheel hub is designated 31 and has the rear edge thereof formed with a web 32, said hub being cut away, as at 33 so that it may be fitted over the block 26 and the web 32 is cut away, as at 34, so as to receive the arm 27. On the lower face of the web 32 is a hinge barrel 35 having an opening 36 to receive the pivot pin 29. The wheel is placed in a vertical position and slipped sidewise on to the pin 29, so that said pin will extend through the barrel 35 and hinge the wheel hub relative to the block 26.

The barrel 35 has an angularly disposed apertured lug 37 and when the barrel 35 is on the pin 29, the lug 37 is disposed in parallelism with the side arms 27, so that when the wheel hub is tilted into a plane parallel with the axis of the post 1, the aperture of the lug 37 will register with the aperture 28 of the arm 27, and permit of the shackle 38 of a padlock 39 being placed in position to lock the wheel in a tuted position. In view of the apertures 28 and 37 being adjacent the upper end of the post 25, the padlock can be easily and quickly placed in position without reaching under the front side of the wheel. With the lock in position it is impossible to lower the tilted wheel on to the block 26 of the steering post.

Besides the wheel hub having a temporary locking device 38 for maintaining it in operative relation to the hub 26, the padlock may be placed in engagement with the end of the pin 29 as a permanent lock; the aperture 30 of said pin receiving the shackle 38 of the padlock. It is then impossible for a person to steal the wheel.

With the wheel completely removed, the padlock may be placed in engagement with the arm 27 or even in engagement with the pin 29, and thus prevent another wheel being substituted for the usual wheel.

From the foregoing, it will be observed that I have means for locking a tiltable steering wheel in an inactive position means to facilitate removing the steering wheel, and means to render a steering post non-receptive for any other steering wheel. It is therefore practically impossible for an unauthorized person to use the steering mechanism of an automobile or any other vehicle which includes my invention.

I would have it understood that the structural elements herein referred to are susceptible to such variations and modifications as fall within the scope of the appended claims.

What I claim is:

1. A steering wheel connection comprising a stationary post member having side lugs, a pin connecting said side lugs, a movable wheel member on said stationary post member and having a slotted barrel to receive said pin, the relation between said pin and the barrel being such that said movable wheel member may be completely removed from said stationary post member when said movable wheel member is at a defined angle to said stationary post member.

2. A steering wheel connection as characterized in claim 1, wherein the angle of the movable wheel member for removal from the stationary post member is defined by the shape of the pin.

3. A steering wheel connection as characterized in claim 1, wherein additional means is adapted for locking said movable wheel member in an open position and rendering said stationary post member non-receptive to a movable wheel member.

4. The combination of a steering post, a stationary hinged member thereon, a wheel hub adapted to fit on said steering post and connected to said stationary hinged member so as to be either hinged thereto or be removable from said stationary hinged member, and means to render said stationary hinged member non-receptive to the movable hinged member.

5. The combination of a steering post, a disengageable and removable steering wheel adapted for operation on said post, and means including a pin fixed relative to the post and a barrel carried by the wheel establishing a connection between said post and wheel so that said wheel may be tilted to an inactive position and also completely removed from the post.

6. The combination with a steering post, and a block on its upper end, of a steering wheel hub adapted to fit on said block, and a hinge connecting said wheel hub to said block so that said wheel may be swung to an inactive position relative to said post and when at a defined angle relative to said post removed therefrom.

7. The combination set forth in claim 6 wherein said hinge includes an arm to facilitate locking said wheel in an inactive position.

8. The combination set forth in claim 6 and wherein the block is adapted to support means to render said steering post non-receptive to another wheel.

In testimony whereof I affix my signature in the presence of two witnesses.

WILLIAM H. APPLEBY.

Witnesses:
 KARL H. BUTLER,
 ANNA M. DORR.